United States Patent [19]
Larson

[11] Patent Number: 6,059,860
[45] Date of Patent: May 9, 2000

[54] SORPTIVE ARTICLES

[75] Inventor: James M. Larson, Saint Paul, Minn.

[73] Assignee: 3M Innovative Properties Company, St. Paul, Minn.

[21] Appl. No.: 08/952,249

[22] PCT Filed: Jun. 21, 1996

[86] PCT No.: PCT/US96/10735

§ 371 Date: Nov. 14, 1997

§ 102(e) Date: Nov. 14, 1997

[87] PCT Pub. No.: WO97/00724

PCT Pub. Date: Jan. 9, 1997

[51] Int. Cl.[7] .............................. B01D 53/04; B01D 53/28
[52] U.S. Cl. ........................... 95/117; 95/116; 96/117.5; 96/135; 96/153; 55/512
[58] Field of Search .................... 95/116, 117, 127–147; 96/117.5, 135, 153, 154; 55/512, 514

[56] References Cited

U.S. PATENT DOCUMENTS

| | | |
|---|---|---|
| 3,704,806 | 12/1972 | Plachenov et al. ................ 220/64 |
| 4,160,059 | 7/1979 | Samejima .................. 96/153 X |
| 4,407,897 | 10/1983 | Farrell et al. ................ 428/516 |
| 4,550,123 | 10/1985 | Lopatin et al. ................ 521/64 |
| 4,626,252 | 12/1986 | Nishizawa et al. ............ 604/370 |
| 4,684,510 | 8/1987 | Harkins .................. 96/135 X |
| 4,726,989 | 2/1988 | Mrozinski ................ 428/315.5 |
| 5,120,594 | 6/1992 | Mrozinski .................. 428/195 |
| 5,226,937 | 7/1993 | Linnersten et al. .......... 96/117.5 |
| 5,238,623 | 8/1993 | Mrozinski .................. 264/48 |
| 5,350,443 | 9/1994 | von Blücher et al. ............ 96/135 |
| 5,417,743 | 5/1995 | Dauber .................. 96/117.5 X |
| 5,593,482 | 1/1997 | Dauber et al. .............. 96/117.5 |
| B1 4,342,811 | 2/1995 | Lopatin et al. .............. 428/220 |

FOREIGN PATENT DOCUMENTS 55-119418  9/1980  Japan ........................... 96/153

*Primary Examiner*—Robert Spitzer
*Attorney, Agent, or Firm*—Roger R. Tamte

[57] ABSTRACT

A sorptive article is provided. The sorptive article includes a polyolefin, a wax which is miscible with the polyolefin at the melt temperature of the polyolefin but phase separates on cooling of the article, and sorptive particles distributed in the article. Also provided is a method for removing moisture or other vaporous or liquid material from air or an object in the environment utilizing a novel sorptive article of the invention.

30 Claims, No Drawings

SORPTIVE ARTICLES

FIELD OF THE INVENTION

The present invention relates to polyolefin articles containing sorptive materials and methods of using such articles.

BACKGROUND OF THE INVENTION

Sorptive materials such as desiccants can be supplied in a loose granular form but this can lead to contamination of product with which they come into contact. To overcome this problem, sorptive materials have been supplied as sachets with the particulate sorbent enclosed in a porous material. However, this can lead to clumping of the sorbent in one area of the sachet and consequent inefficient use of the sorbent. To overcome this problem, the sorptive material has been provided as a sachet having multiple discrete connected smaller areas.

Sorptive materials have also been incorporated into polyolefin films, particularly where the sorptive material is used in a multilayer construction to protect a moisture-sensitive layer such as a film of an ethylene/vinyl alcohol copolymer. However, in such constructions the sorptive material absorbs water vapor at appreciable rates only when heated during a retort process.

To overcome such problems, films have been developed wherein the films have a polymeric matrix with a system of interconnecting micropores and are loaded with particulate sorbent material which may be a desiccant material. Such films are produced by forming a melt blend of the sorbent particles, the polymer and a selected diluent, extruding the film and removing the diluent. The water to be sorbed, generally as water vapor, can then rapidly contact the particulate material through the pores of the polymeric matrix, and sorption of the water by the particulate material can be achieved. However, when the sorbent particulate material is thus available for sorption of the water, the film must be carefully stored prior to use to prevent premature sorption of environmental water vapor and should be protected with a dry atmosphere during manufacturing and converting.

In addition to desiccants for sorption of water, there is also need to sorb other materials such as carbon dioxide and acidic gases and a wide variety of organic materials.

U.S. Pat. No. 4,550,123 teaches textile quality polymeric fibers or thin films made porous by extraction of a diluent included during manufacture of the fiber or film. This reference does not contemplate fibers or films in which a wax is retained in the fiber or film during use of the fiber or film. This reference states in column 3, lines 21–27, the yarns, fibers or films so formed, are extracted with a suitable solvent or solvents for removal of the diluent. This extraction porosifies the polymer leaving the sorbent particles in an active state accessible to vapors, liquids or solutes present on or at the surface of the matrix.

U.S. Pat. No. 4,626,252 discloses backing sheets for a diaper which are made from a stretched extruded film made from a polyolefin, a wax like hydrocarbon polymer and a filler. Presumably the particles are included to assist in formation of pores with film when the film is stretched.

SUMMARY OF THE INVENTION

The present invention relates to a sorptive article comprising a polyolefin, a wax which is miscible with the polyolefin at the melt temperature of the polyolefin but phase separates on cooling of the article, and particulate sorbents distributed in the article. Optionally, the articles of the invention may also contain a dispersant for the sorbent. The sorptive articles may be in the form of films, fibers, pellets, beads and other convenient shapes. The sorptive films of the invention can be used as formed or the films may be layered or laminated with other films and materials.

The present invention further provides a method for removing moisture or other materials from air or an object in the environment comprising providing proximate to said air or object a sorptive article comprising a polyolefin, a wax compound which is miscible with the polyolefin at the melt temperature of the polyolefin but phase separates on cooling of the article, and sorptive particles distributed in the article.

DETAILED DESCRIPTION OF THE INVENTION

Polyolefins useful in the present invention include polyethylenes such as high density polyethylene (HDPE), ultra-high molecular weight polyethylene (UHMWPE), low density polyethylene (LDPE) and linear loss density polyethylene (LLDPE), polypropylene and blends thereof and copolymers of ethylene and propylene. Other useful polyolefins include polybutylene and ethylene vinyl acetate copolymer.

Waxes useful in the present invention should be miscible with the polyolefin at the melt temperature of the polyolefin and include paraffin waxes, microcrystalline waxes, Fisher-Tropsch waxes, low molecular weight polyethylene waxes preferably having a number average molecular weight of less than about 10,000, more preferably less than about 5000, most preferably less than about 2500, and ethylene-propylene copolymers preferably having a number average molecular weight of less than about 10,000, more preferably less than about 5000, most preferably less than about 2500. Natural waxes such as beeswax, Carnauba wax or candelilla wax can be used, as can vegetable waxes such as obtained by hydrogenating vegetable oils.

Molecular sieves are a particularly useful class of sorptive particles for providing desiccant properties to the articles of the invention and include synthetically produced crystalline metal alumino-silicates or naturally occurring sources containing crystalline metal alumino-silicates that have been activated for adsorption by removing their water of hydration. Because little or no change in structure occurs during this dehydration, unusually highly porous adsorbents are formed that have a strong affinity for water. The pores of any particular type of molecular sieve are uniform in size and of molecular dimensions. The molecular sieves are crystalline zeolites having a basic formula of $M_{2/n}OxAl_2O_3ySiO_2zH_2O$ where M is a cation of n valence. An example of a commercially available molecular sieve is Type 4A which has the unit cell formula $Na_{12}[(AlO_2)_{12}(SiO_2)_{12}]27H_2O$.

Other useful desiccants include silica gels, silica, clay, activated aluminum, calcium oxide (CaO), $CaSO_4$, $MgSO_4$ and $CoCl_2$. A strongly deliquescent desiccant such as $CaCl_2$ can result in excessive exudation of liquid to the surface of the film, which could limit its utility to certain applications.

Another useful class of solid desiccants is organic polymers such as polyacrylic acid and salts thereof, polyacrylamides, sulfonated polymers, and cellulosics such as sodium carboxy methyl cellulose.

Hydrophobic molecular sieves are also useful. Compared to the hydrophilic molecular sieves (such as Type 4A), these molecular sieves have greatly reduced or no aluminum. Abscents™ molecular sieves, sold by UOP, are an example of a hydrophobic molecular sieve. These are useful for adsorption of organic acids, ammonia, aldehydes, sulfur compounds, ketones, indoles, and amines. Hydrophilic molecular sieves are also capable of sorbing these types of organic materials but in the presence of water vapor, sorption of water vapor tends to predominate.

In addition to sorption of water vapor, potassium carbonate and calcium oxide are useful for sorption of acidic gases. Calcium hydroxide, formed from reaction of calcium oxide with water, is useful for sorption of carbon dioxide. Molecular sieves are useful for sorption of ethylene from wrapped vegetables, fruits, or cheese to extend storage life. Silica and various types of surface treated silicas are useful as adsorbents in a variety of chromatographic separations.

For high density polyethylene and polypropylene which have a melt index of about 1 or less according to ASTM Test Method D1238 (190° C./5 kg for high density polyethylene and 230° C./2.16 kg for polypropylene), the sorptive article preferably comprises (1) about 20 to 80 parts by weight polyolefin, (2) about 80 to 20 parts by weight wax such that the sum of the parts by weight of polyolefin and wax is equal to 100 and (3) between about 110 volume percent sorptive particles based on the volume of wax and an amount to provide at least about 10 weight percent sorptive particles based on the weight of total film. (That is, there are about 110 volume parts or less sorptive particles measured in their dry state per 100 volume parts of wax; for molecular sieves, this is approximately equivalent to 140 weight parts per 100 weight parts of wax). More preferably, polyolefin/wax proportions are (1) about 25 to 75 parts by weight polyolefin, and (2) about 75 to 25 parts by weight wax; and most preferably (1) about 30 to 45 parts by weight polyolefin, and (2) about 70 to 55 parts by weight wax.

For polyolefins which have higher melt indexes, e.g., above about 1, the sorptive article preferably comprises (1) about 50 to 80 parts by weight polyolefin, and (2) about 50 to 20 parts by weight wax; more preferably (1) about 55 to 75 parts by weight polyolefin, and (2) about 45 to 25 parts by weight wax; and most preferably (1) about 55 to 70 parts by weight polyolefin, and (2) about 45 to 30 parts by weight wax (the sum of the parts by weight of polyolefin and wax being equal to 100); and the sorptive particles comprise between about 110 volume percent sorptive particles based on the volume of the wax and an amount to provide at least about 10 weight percent sorptive particles based on the weight of total film.

For ultrahigh molecular weight polyethylene (such as GUR 4132 made by Hoechst Celanese; UHMWPE generally has a molecular weight above about 2–6 million, and has a melt index of substantially zero), very high amounts of wax may be used. For example, a sorptive article comprising UHMWPE, generally comprises (1) about 2 to 50 parts by weight UHMWPE and (2) 98 to 50 parts by weight wax, and more preferably (1) about 4 to 20 parts by weight UHMWPE and (2) 96 to 80 parts by weight wax.

Preferably, the sorptive particulate is provided as a fine powder and sufficiently dry such that it can be used without grinding or drying. If the sorptive particulate is not available in powdered form, beads or pellets can be readily ground and mechanically sieved to remove larger particles. Generally, the largest particles should be about ten times smaller than the smallest orifice that they must pass through during processing.

A dispersant is optionally added to the mixture of wax and sorptive particulate to aid in wetting out and dispersing the sorptive particulate in the wax. The more thorough the dispersion of particles the better, though some sorbent particles have been found to be effective even when grouped or clumped together, i.e., agglomerated. On a macro scale, the distribution is generally rather uniform, e.g., adjacent cubic millimeters in the sorptive portions of articles of the invention preferably contain similar numbers of particles or agglomerates. The wax phase separates from the polyolefin in a distributed manner so that wax is distributed throughout the sorptive article. Preferably, the dispersant is a polymer which has a molecular weight below about 10,000 and which stabilizes the dispersion by steric interaction between the particles.

Preferably, the dispersant is present in an amount of about 1 to 10 weight percent based on the weight of the sorptive particulate and is a solid at ambient temperatures to minimize exudation to the surface of the final shaped article. Useful dispersants include HYPERMER™ B246, HYPERMER™ LP1, and HYERMER™ LP4, available from ICI Specialty Chemicals Co.

Nucleation of the polyolefin as the blend of polyolefin and wax cools and phase separation occurs may be enhanced (e.g., the rate of crystallization increased) in some articles of the invention by the effect of a nucleating agent. The particulate sorbent or crystallites of the wax in an article of the invention may act as a nucleating agent, such that a separate nucleating agent is not needed. Other useful nucleating agents have been taught in the prior art, especially when the polyolefin is polypropylene, to increase the rate of crystallization of the polymer, which tends to increase the strength of the article. Useful nucleating agents include aryl alkanoic acid compounds, benzoic acid compounds, and certain dicarboxylic acid compounds as disclosed in U.S. Pat. No. 4,726,989 (Mrozinski), which is incorporated herein by reference. Polymeric pigments may also be used as nucleating agents as is known in the art. The nucleating agent preferably comprises about 0.1 to 5 parts by weight of the polyolefin weight.

Sorptive articles of the invention that change color as vapor or other material is sorbed are advantageous to show that sorption has occurred and to show the degree of sorption that has occurred. Commercially available desiccants may have a color indicator incorporated into the desiccant (color-indicating grades of molecular sieves, silica gel, and activated alumina from ADCOA and color indicating grade of Drierite ($CaSO_4$) from W. A. Hammond Drierite Co., for example). Products of the invention can be made color-indicating by incorporation of such color-indicating desiccants or other sorbent particulates.

Other products of the invention are made color-indicating through incorporation of other color-indicating agents such as finely powdered $CoCl_2$. When mixed with a non-indicating sorptive particulate such as molecular sieves and silica gel, $CoCl_2$ achieves good correlation between color change and the percent of material sorbed.

$CoCl_2$ itself is a desiccant having a fairly high adsorptive capacity, picking up six waters of hydration, and may be used as a sorptive particle by itself. When $CoCl_2$ is used in an amount equal to about one percent of total film weight, it provides a color change that can be seen by eye for about 10 mil thick (250-micrometer-thick) films. The amount needed will depend upon film thickness and also on percent particulate in the film. In any case, this is something that can be determined easily through simple experimentation.

$CoCl_2$ is deliquescent, but problems with exudation of liquid to the film surface can be avoided by grinding the $CoCl_2$ to a fine powder (<$50\mu$, more preferably $\leq 25$, most preferably ≦10μ). Films made containing 5 wt. % of finely powdered $CoCl_2$ in combination with Type 4A molecular sieve or silica gel showed no liquid exudation when tested at 50% RH/20° C.

The articles of the present invention can be prepared using either a batch or continuous method. In the batch process, the wax is melted, and the dispersant (if used) is added and mixed into the wax, whereupon the sorptive particulate is added while mixing continues. The polymer is added with continued mixing and heating until a homogeneous melt is formed. The melt can then be pressed between plates to form a film or molded into pellets, beads, or other desired forms.

In the continuous process, the wax is heated to melt (e.g., by using a hot plate). Then, a dispersant (when used) is added, followed by addition of the sorptive particulate while mixing using a high shear mixer such as a dispersator. Mixing is continued until the sorptive particulate is well mixed in the wax. This wax particulate mixture is then heated at about 150 to 180° C. for 15 to 45 minutes to degas it. The wax particulate mixture is fed to an extruder, preferably a twin screw extruder, concurrently with the polyolefin, where the wax particulate mixture and the polymer are thoroughly melt blended. The melt is extruded and quenched, for example by casting the extrudate as a film onto a temperature-controlled, smooth or patterned (e.g., as described in U.S. Pat. Nos. 5,120,594 and 5,238,623) casting wheel or by forming a blown film in air, to cause thermally induced phase separation. Alternatively, the melt may be extruded as pellets or fibers or ropes. At least for thicker material such as ropes or strands, the extrudate is generally quenched in a non-sorbent liquid such as a liquid fluorocarbon (e.g., 3M's Fluorinert FC 77) or in some cases in water followed by drying. The sorptive article can be used as formed or molded into other shapes as desired.

With either the batch or continuous method, the article is completed without extracting the wax from the article. The presence of the wax moderates the adsorption rate of the sorptive particulate to provide rates which are much slower than for sorptive particulates (such as molecular sieves) in porous films and which are much faster than for sorptive particulates in polyolefin alone. Thus, the sorptive articles of the invention are storage stable, yet efficient. Another advantage arising from use of the wax is the ability to have higher loadings of sorptive particles than would otherwise be possible. The inclusion of the wax lowers the viscosity of the melt, which allows more particulate to be added. Also, the rate of sorption can be affected through choice of wax and proportion of wax relative to polymer.

Sorptive articles of the invention are sorptive whether or not they are porous. Apparently, vapor can pass through the polyolefin/wax mixture surrounding the sorptive particle. However, the wax generally retards sorption (in comparison to an article in which there is a void in the article in the places otherwise occupied by the wax) and prevents premature sorption.

The rate of sorption can be increased by making the sorptive article (generally a film, but also fibers, strands or ropes) porous by stretching. Sorptive articles of the invention can be sold as non-porous films and activated before use by stretching for rapid adsorption.

Sorptive articles of the invention that become porous upon stretching generally include at least 15 or 20 volume percent sorptive particles. Best results so far have been achieved with molecular sieves.

Articles of the invention, especially when in film form, may carry a film or sheet laminated to one or both sides, for example, to close or seal one side of the article and direct its sorptive activity to the other side. Also, removable films may be laminated to the article to protect the article from premature absorption. Good films for performing such a sealing or inhibiting function include film or sheets meeting United States Military Specification MIL-B-131H, Type 1, Class 1, such as Marvelseal 470 (from Ludlow Corp., Laminating and Coating Division Exeter, NH) or FR 2175-B or Foil Pak 6 from Bell Fibre Products Corp., Columbus, Ga. Typically these sheets or films comprise a metal foil and often also include another layer such as a heat-sealable polymeric layer. In other embodiments, a film or other article of the invention is incorporated into packaging such as envelopes, where the film or other article is protected from premature sorption and is ready to act as a sorbent when contents needing protection are placed in the packaging.

The following examples further illustrate this invention, but the particular materials and amounts thereof in these examples as well as other conditions and details, should not be construed to unduly limit this invention. In the examples, all parts and percentages are by weight unless otherwise specified.

Sorptive Activity Test

Films prepared were tested for water vapor sorptive activity according to the following method. A sample of film is weighed and exposed to 50% relative humidity at 20° C. unless otherwise indicated. The sample is weighed periodically until no further increase in weight is observed. The time required for adsorption of 10%, 50% and 90% of the maximum quantity sorbed were determined by interpolation of the data. For molecular sieves, the maximum weight increase was typically about 85 to 95% of the theoretical maximum which was calculated from the film weight, the percent molecular sieves in the film, and the sorptive activity of the molecular sieves. The sorptive activity of Type A molecular sieves was typically about 20–22% by weight as received and about 28% by weight for Type 13X.

Mixing Method

The examples teach films prepared by a continuous method using an extruder (described in Example 1, sometimes referred to as the Extruder Method) or a batch method (described in Examples 14–17, sometimes referred to as the Batch Method).

EXAMPLE 1

Wax, 55.2 weight percent of total film composition, X-2044, available from Petrolite Corporation, and 1 weight percent HYPERMER™ B246 dispersant available from ICI Specialty Chemicals Co., were heated to about 100° C. until melted. Desiccant, 11.4 weight percent of total film composition Type 4A molecular sieve powder, obtained through Oxygen Service Co. (St. Paul, Minn.), was added to the wax mixture while mixing under high shear conditions using a dispersator, Model 89, available from Premier Mill Corporation. After wetting out the desiccant in the molten mixture of wax and dispersant, the dispersator speed was increased to the maximum speed that did not cause discharge of the mixture from the mixing container, about 2000 rpm, for 1 min. The dispersator speed was then lowered to a speed sufficient to continue the mixture stirring while maintaining the mixture at about 150° C. for 30 min. The mixture was then pumped into a 25-mm-diameter-825- mm-long twin screw extruder using a gear pump. The gear pump was enclosed and the air around it heated. All lines were heated to a temperature at least as high as the melting point of the wax. The wax/desiccant mixture was pumped into an intermediate extruder zone. High density polyethylene, 32.8 weight percent GM 9255, available from Fina Oil and Chemical Co., was dropped into the feed throat using a gravimetric feeder. The extruder barrel temperature ranged from 270 to 170° C. (520–340° F.) down the length of the barrel with a screw speed of 120 rpm. The mixture was extruded through a 20 cm wide die at about 245° C. onto a smooth casting wheel maintained at about 71° C. The thus-prepared film was wound on a plastic core, placed in a vapor tight container flushed with dry gas and sealed.

The film was 0.25 mm thick and was tested for desiccant activity. The film adsorbed 10% the maximum quantity adsorbed in 0.8 hours, 50% in 22 hours and 90% in 63 hours.

EXAMPLES 2–8

In Examples 2–8, films were prepared as in Example 1 except the extruder barrel temperature range was about 280 to 255° C., the die temperature was 255° C., the polyolefin was FINA™ 2804 high density polyethylene and the waxes used were AC 1702 low molecular weight polyethylene available from Allied-Signal Corp. (Example 2), M-5150 microcrystalline wax available from Moore & Munger Marketing, Inc., (Example 3), X-2025 branched polyethylene/polypropylene copolymer wax available from Petrolite Corp. (Example 4), PETROWAX™ 8618 microcrystalline wax available from Moore & Munger Marketing, Inc., (Example 5), X-2018 branched polyethylene/polypropylene copolymer wax available from Petrolite Corp. (Example 6), and PARAFLINT™ C80, a Fisher-Tropsch wax available from Moore & Munger Marketing, Inc. (Examples 7 and 8). Each film contained one weight percent dispersant and the amounts of wax and Type 4A molecular sieve set forth in Table 1. The films were tested for desiccant activity and the results are set forth in Table 2.

TABLE 1

| Example No. | Polymer (Wt. %) | Wax (Wt. %) | Desiccant (Wt. %) | Film Thickness (mm) |
|---|---|---|---|---|
| 2 | 20.4 | 59.3 | 19.3 | 0.27 |
| 3 | 23.9 | 56.7 | 18.4 | 0.25 |
| 4 | 24.2 | 56.5 | 18.3 | 0.18 |
| 5 | 25.4 | 55.6 | 18.0 | 0.27 |
| 6 | 24.3 | 56.4 | 18.3 | 0.30 |
| 7 | 25.4 | 55.6 | 18.0 | 0.23 |
| 8 | 52.2 | 37.6 | 9.2 | 0.27 |

TABLE 2

| Example No. | Time Required to Reach Given Percent Adsorption in Hours at 50% RH/20° C. | | |
|---|---|---|---|
|  | 10% | 50% | 90% |
| 2 | 2.0 | 23 | 90 |
| 3 | 1.8 | 45 | 129 |
| 4 | 2.6 | 39 | 115 |
| 5 | 4.5 | 87 | 276 |
| 6 | 2.9 | 47 | 157 |
| 7 | 6.8 | 79 | 264 |
| 8 | 8.2 | 73 | 232 |

EXAMPLES 9–13

In Examples 9–13, films were made as in Example 1 except the extruder barrel temperature range was about 250 to 190° C. and the die temperature was about 190° C., the polyolefin was DS-5D45 polypropylene available from Shell Chemical Co., the wax was AC 1702 low molecular weight polyethylene available from Allied Signal Corp., The desiccant type was as is indicated in Table 3, each being available from Oxygen Services Co., and the amounts of polypropylene, wax, dispersant and desiccant and the extruder conditions were as set forth in Table 3. MILLAD™ 3905 from Milliken Chemical was added with the polypropylene at 0.3 wt. % relative to weight of polypropylene as nucleating agent. The films were 0.18 to 0.20 mm thick. The films were tested for desiccant activity and the results are also set forth in Table 4.

TABLE 3

| Ex. No. | Polymer (Wt. %) | Wax (Wt. %) | Desiccant Type | Desiccant (Wt. %) | Dispersant (Wt. %) | Nucleating Agent (Wt. %) |
|---|---|---|---|---|---|---|
| 9  | 29.5 | 56.0 | 3A  | 13.7 | 0.7 | 0.09 |
| 10 | 27.8 | 53.6 | 3A  | 17.6 | 0.9 | 0.09 |
| 11 | 28.4 | 56.9 | 4A  | 13.9 | 0.7 | 0.09 |
| 12 | 28.8 | 52.8 | 5A  | 17.4 | 0.9 | 0.09 |
| 13 | 27.3 | 54.0 | 13X | 17.7 | 0.9 | 0.09 |

TABLE 4

| Example No. | Time to Reach Given % Adsorption (in hours) | | |
|---|---|---|---|
|  | 10% | 50% | 90% |
| 9  | 0.5 | 5.5 | 18.8 |
| 10 | 0.5 | 3.8 | 17.2 |
| 11 | 0.5 | 4.0 | 17.3 |
| 12 | 0.5 | 5.5 | 18.8 |
| 13 | 0.5 | 5.5 | 18.3 |

EXAMPLES 14–17 AND COMPARATIVE EXAMPLES C1–C4

In Examples 14–17, films were made by the Batch Method containing 30 weight percent polyolefin, 54.2 weight percent AC 1702 wax, 15 weight percent Type 4A molecular sieves and 0.8 weight percent B246 dispersant. In Comparative Examples C1–C4, films were made containing 15 weight percent Type 4A molecular sieves and 85 weight percent polyolefin. The polyolefins used were FINA™ 2804 high density polyethylene available from Fina Oil and Chemical Co. (Example 14 and Comparative Example C1), ATTANE™ 4602 linear low density polyethylene available from Dow Chemical Co. (Example 15 and Comparative Example C2), HIMONT™ 6723 polypropylene available from Himont USA, Inc. (Example 16 and Comparative Example C3), and EXXON™ 3014 polypropylene available from Exxon Co. (Example 17 and Comparative Example C4). The polyolefin, wax and nucleating agent were mixed in a RHEOCORD SYSTEM 40™ available from Haake Buchler at 20 rpm with heat until soft. The mixing speed was then increased to 100 rpm and the dispersant and desiccant were added in small portions at two minute intervals. Mixing continued until the melt was homogeneous, 30 minutes at 270° C. for Example 14 and Comparative Example C1, 20 minutes at 230° C. for Example 15 and Comparative Example C2, 20 minutes at 270° C. for Example 16 and Comparative Example C3, and 20 minutes at 230° C. for Example 17 and Comparative Example C4. A portion of the melt was withdrawn and pressed into a film between aluminum plates that were covered with 0.18-millimeter-thick polyester film using a hydraulic press heated to 180° C. The mixture was heated in the press for the indicated time and temperature with no force applied by the press during a 5 minute interval and then the press was closed fully for 15 seconds followed by opening of the press and removal of the resultant film. Shims were inserted to achieve film thickness of about 0.5 mm. Each film was tested for desiccant activity. The results are set forth in Table 5.

TABLE 5

| Example No. | Time to Consume Given % of Theoretical Maximum Adsorbed (in hours) | | |
|---|---|---|---|
| | 10% | 50% | 90% |
| 14 | 2.5 | 59 | 165 |
| 15 | 2.5 | 60 | 202 |
| 16 | 3 | 34 | 110 |
| 17 | 2 | 37 | 116 |
| C1 | 20 | 565 | 2100 |
| C2 | 6 | 100 | 420 |
| C3 | 11 | 210 | 740 |
| C4 | 14 | 270 | 1100 |

EXAMPLES 18–26

In Examples 18–26, films were made by the Extrusion Method as in Example 1 except the films contained AC 1702 wax and the polyolefins used were GM 9255 high density polyethylene available from Fina Oil and Chemical Co. (Example 18), 2804 high density polyethylene available from Fina Oil and Chemical Co. (Example 19), 25355N high density polyethylene available from Dow Chemical Co. (Example 20), 65053 high density polyethylene available from Dow Chemical Co. (Example 21), 4005 low density polyethylene available from Dow Chemical Co. (Example 22), ATTANE™ 4602 linear low density polyethylene available from Dow Chemical Co. (Example 23), 6723 polypropylene available from Himont USA, Ltd. (Example 24), 7823 ethylene-propylene copolymer available from Himont USA, Ltd. (example 25), and HIFAX RA061 ethylene-propylene copolymer available from Himont USA, Ltd. (Example 26). The amount of each component and the extruder conditions are set forth in Table 6. The desiccant was Type 4A molecular sieve and the dispersant was Hypermer B246. The film of Example 24 also contained 0.1 wt. % Millad 3905 nucleating agent. Each film was tested for desiccant activity. The results are set forth in Table 7.

TABLE 6

| Ex. No. | Polymer (Wt. %) | Wax (Wt. %) | Desiccant (Wt. %) | Dispersant (Wt. %) | Extruder Barrel (° C.) | Screw RPM | Die Temp (° C.) |
|---|---|---|---|---|---|---|---|
| 18 | 23.2 | 57.3 | 18.6 | 0.9 | 282–249 | 150 | 232 |
| 19 | 29.5 | 56.7 | 13.2 | 0.6 | 270–171 | 150 | 254 |
| 20 | 54.0 | 37.0 | 8.6 | 0.4 | 271–216 | 120 | 216 |
| 21 | 54.0 | 37.0 | 8.6 | 0.4 | 271–216 | 120 | 216 |
| 22 | 50.0 | 39.6 | 9.9 | 0.5 | 271–171 | 120 | 260 |
| 23 | 57.7 | 33.5 | 8.4 | 0.4 | 271–171 | 120 | 171 |
| 24 | 27.2 | 46.0 | 25.5 | 1.2 | 249–193 | 120 | 193 |
| 25 | 34.3 | 52.8 | 12.3 | 0.6 | 282–232 | 120 | 232 |
| 26 | 34.2 | 52.9 | 12.3 | 0.6 | 282–232 | 90 | 232 |

TABLE 7

| Ex. No. | Film Thickness (mm) | % RH 20° C. | Time to Reach Given % Adsorption (in hours) | | |
|---|---|---|---|---|---|
| | | | 10% | 50% | 90% |
| 18 | 0.24 | 50–60 | 0.4 | 9 | 28 |
| 19 | 0.23 | 50–60 | 0.6 | 13 | 42 |
| 20 | 0.28 | 50 | 1.5 | 18 | 50 |
| 21 | 0.28 | 50 | 0.9 | 16 | 43 |
| 22 | 0.25 | 55–60 | 0.6 | 11 | 34 |
| 23 | 0.24 | 55–60 | 0.8 | 16 | 40 |
| 24 | 0.20 | 50–60 | 0.3 | 5 | 20 |
| 25 | 0.28 | 50 | 0.7 | 10 | 27 |
| 26 | 0.28 | 50 | 0.8 | 9 | 23 |

EXAMPLE 27

A film was prepared by the Extrusion Method as in Example 1 except the film contained 63.2 parts by weight X-2044 ethylene-propylene copolymer wax available from Petrolite Corp., 0.7 parts by weight HYPERMER™ B246 dispersant available from ICI Chemical Co., 15 parts by weight Type 4A desiccant, and 22 parts by weight DS-5D45 polypropylene available from Shell Chemical Co. The extruder barrel temperature was 270–193° C. (520–380° F.), the die temperature was 193° C. (380° F.), the screw speed was 120 rpm. The film formed had a thickness of about 0.27 mm. The film was tested for desiccant activity. The film adsorbed 10% of the theoretical maximum in 1.9 hours, 50% adsorption in 31 hours and 90% adsorption in 111 hours.

EXAMPLES 28 AND 29

In Example 28, a film was prepared by the Extrusion Method as in Example 1 except the film contained 49.7 parts by weight AC 1702 wax available from Allied-Signal Corp., no dispersant, 25.5 parts by weight Type 4A desiccant, and 24.8 parts by weight DS-5D45 polypropylene available from Shell Chemical Co. The extruder barrel temperature was 270–193° C. (520–380° F.), the die temperature was 193° C. (380° F.), the screw speed was 150 rpm. The film formed had a thickness of about 0.28 mm. The film was tested for desiccant activity. The film had 10% adsorption in 1 hour, 50% adsorption in 19.7 hours and 90% adsorption in 60 hours.

In Example 29, a film was made as in Example 28 except 2.5 weight percent HYPERMER™ B246 disperant based on the weight of the desiccant was added. The film was tested for desiccant activity. The film had 10% adsorption in 1.0 hour, 50% adsorption in 21.3 hours and 90% adsorption in 65 hours.

EXAMPLE 30

A film was prepared using the Batch Method generally described in Examples 14–17 except the polyolefin was DS-5D45 polypropylene available from Shell Chemical Company. The wax was paraffin, Catalog No. 32720-4 from Aldrich Chemical Co., the desiccant was Type 4A molecular sieve and the dispersant was HYPERMER™ B246. The amounts of each component were: polypropylene—30 parts by weight; wax—54 parts by weight; desiccant—15 parts by weight; dispersant—0.8 parts by weight. The components were mixed in a batch mixer at 290° C. for 20 min. and the resulting mixture was pressed at 135° C. to achieve a film thickness of 0.22 mm. The film was tested for desiccant activity. The film had 10% adsorption in 0.7 hour, 50% adsorption in 22 hours and 90% adsorption in 89 hours.

EXAMPLES 31–36

Sorptive films were prepared by the Batch Method using UHMWPE (ultrahigh molecular weight polyethylene; grade GUR 4132 from Hoechst-Celanese, specified by the manufacturer as having a molecular weight between 4 to 5 million); waxes (either AC 1702 from Allied Signal or M-5150 from Moore and Munger); and a molecular sieve (Type 4A, in powder form, from Oxygen Supply Services, St. Paul, Minn.). The batch mixing conditions were 150° C. for 15 min. at 100 rpm. The material was reheated in the press at 160° C. for 3 minutes while gradually closing the press and then heated for 5 minutes with the press fully closed. Metal shims were used to limit press closure. Tables 8 and 9 provide compositions and water vapor adsorption results, respectively.

TABLE 8

| Example | Wt. % UHMWPE | Wax, Wt. % | Desiccant, Wt. % | PE/Wax Ratio | Thickness mils (mm) |
|---|---|---|---|---|---|
| 31 | 4.00 | M-5150 48.00 | 4A MS, 48.00 | 7.7/92.3 | 10–11 (0.25–0.28) |
| 32 | 0.84 | AC 1702 41.42 | 4A MS, 57.74 | 2/98 | 9–10 (0.23–0.25) |
| 33 | 4.00 | AC 1702, 62.90 | 4A MS, 42.10 | 6/94 | 9–10 (0.23–0.25) |
| 34 | 15.16 | AC 1702, 35.37 | 4A MS, 49.47 | 30/70 | 10–12 (0.25–0.30) |
| 35 | 29.45 | AC 1702, 29.45 | 4A MS, 41.10 | 50/50 | 10–11 (0.25–0.28) |
| 36 | 2.15 | M-5150, 40.80 | Syloid AL-1 57.08 | 5/95 | 11–12 (0.28–0.30) |

TABLE 9

| Example | % of Theo. Wt. Gain | mg water/ gram film | Time to Reach Given % of Actual Wt. Gain in Hours | | |
|---|---|---|---|---|---|
| | | | 10% | 50% | 90% |
| 31 | 102 | 99 | 2.7 | 36.5 | 113.6 |
| 32 | 96 | 125 | 1.0 | 21 | 52 |
| 33 | 93 | 62 | 1.6 | 22.9 | 86.2 |
| 34 | 92 | 102 | 5.0 | 98 | 335 |
| 35 | 91 | 84 | 5.0 | 85 | 290 |
| 36 | 77 | 118 | 3.5 | 49 | 240 |

EXAMPLES 37 and 38

Sorptive films were prepared by the Batch Method using polybutylene (PB) (Example 37) and ethylene vinyl acetate (EVA) (Example 38) as polyolefins. The PB was grade DP 8010 (a co-polymer containing 6% ethylene), from Shell Chemical Co. The EVA was Elvax 265 (28% vinyl acetate), from the Du Pont Co. (Wilmington, Del.). The wax was AC 1702, from Allied Signal. In several examples, a small amount of Irganox 1010, an antioxidant from Ciba Geigy, was added to minimize degradation. Mixer conditions were 270° C. for 30 min. at 100 rpm for examples 37, 38 and comp. 5 and 150° C. for 10 minutes at 100 rpm for example Comp. 6. Press conditions were 180° C. for 5 min. for Examples 37, 38, and comp. 5 and 160° C. for 5 min. for Comp. 6.

Comparative examples (C5 and C6) were prepared without any wax. For Comparative Example 5, molecular sieves and PB without any wax, the rate of adsorption was slower than for Example 37, which contained wax. For Comparative Example 6, molecular sieves and EVA without any wax, the rate of adsorption was somewhat faster than for Example 38. In either case, addition of wax is useful for controlling the rate of adsorption through choice of type of wax and amount. Also, wax facilitates processing by, e.g., reducing the tendency of EVA to crosslink.

TABLE 10

| Example | Polymer Wt. % | Wt. % AC 1702 | Wt. % Type 4A | Wt. % Irganox 1010 | Thickness mils (mm) |
|---|---|---|---|---|---|
| 37 | PB 24.98 | 49.96 | 24.98 | 0.08 | 7–9 (0.18–0.23) |
| Comp. 5 | PB 74.94 | None | 24.98 | 0.08 | 10–11 (0.25–0.28) |
| 38 | EVA 24.98 | 49.96 | 24.98 | 0.08 | 8–9 (0.20–0.23) |
| Comp. 6 | EVA 75.00 | None | 25.00 | 0 | 10–12 (0.25–0.30) |

TABLE 11

| Example | % of Theo. Wt. Gain | mg water/ gram film | Hours to Reach Given % of Actual Wt. Gain | | |
|---|---|---|---|---|---|
| | | | 10% | 50% | 90% |
| 37 | 91.3 | 55.6 | 0.7 | 8.0 | 30.0 |
| Comp. 5 | 86.7 | 50.1 | 1.1 | 18.0 | 65.0 |
| 38 | 74.7 | 39.2 | 0.4 | 2.7 | 16.0 |
| Comp. 6 | 80.6 | 45.3 | 0.3 | 2.0 | 6.0 |

EXAMPLES 39 AND 40

Sorptive films were prepared by the Batch Method from polypropylene, Type 4A molecular sieve, and two different waxes: a higher molecular weight, highly branched wax (Epolene C-10; Eastman Chemical Co.; described by its manufacturer as a highly branched, medium molecular weight PE wax having an $M_w$ of 35,000 and $M_n$ of 7,700 as determined by GPC) and beeswax (a bleached, white grade obtained from Aldrich; Cat. No.24,322-1). Mixer conditions were 270° C. for 30 min. at 100 rpm. Press conditions were 180° C. for 5 min.

TABLE 12

| Example | Wt. % PP | Wax, Wt. % | Wt. % Type 4A | Wt. % Irganox 1010 | Thickness mils (mm) |
|---|---|---|---|---|---|
| 39 | 24.98 | E polene C-10, 49.96% | 24.98 | 0.08 | 8–9 0.20–0.23 |
| 40 | 24.98 | Beeswax, 49.96% | 24.98 | 0.08 | 8–10 (0.20–0.25) |

TABLE 13

| Example | % of Theo. Wt. Gain | mg water/ gram film | Hours to Reach Given % of Actual Wt. Gain | | |
|---|---|---|---|---|---|
| | | | 10% | 50% | 90% |
| 39 | 91.9 | 53.1 | 1.5 | 26.0 | 83.0 |
| 40 | 104.6 | 60.4 | 1.5 | 21.0 | 66.0 |

EXAMPLES 41–46

Sorptive films were prepared by the Extrusion Method from polypropylene (PP) (Shell DS 5D451) (Examples 41–45) or high density polyethylene (Shell 1285) (HDPE)

(Example 46) and AC 1702 a low-molecular-weight polyethylene wax from Allied Signal and dispersants and desiccants as listed in Table 16. Table 14 lists conditions under which the desiccants were dried before mixing into the wax, and also lists the weight gain of particles alone, before incorporation into the sorptive film as determined at 50% RH/20° C.

The calcium oxide used did not require drying. The other desiccants were dried at 250° C. for 18 hours before using, except that potassium carbonate was dried at 150° C. for 18 hours. The potassium carbonate was nominally −325 mesh powder but contained large agglomerates, so it was ground using an electric coffee grinder and passed through a 270 mesh wire sieve.

TABLE 14

| Desiccant | Source/ Cat. No. | % Wt. Gain at 50% RH/20° C. | Drying Conditions Temp. (C.) | Hours |
|---|---|---|---|---|
| Calcium Oxide | Alfa/#10923 | 39.1 | — | — |
| Potassium Carbonate | Aldrich/ 34,782–5 | 107.6 | 150 | 18 |
| Magnesium Sulfate | Alfa/#33337 | 85.0 | 250 | 18 |
| Syloid AL-1 (silica gel) | Grace Division | 25.0 | 250 | 18 |
| Hi-Sil SBG (silica) | PPG Industries | 7 | 250 | 18 |

Extrusion conditions are given in Table 15 and compositions in Table 16. The films were cast onto a patterned casting wheel having a pattern of micro-sized pyramids on the surface with the wheel at a temperature of 120° F. in Example 41 and at 150° F. in the other examples. There were 100 pyramids per square inch (15.5 per square cm). The pyramids were 45°, four-sided, and were 5 mil (0.13 mm) high.

TABLE 15

| Example | Extruder Barrel Temp. Range (°F.) (°C.) | Screw RPM | Die Temp. (°F. (°C.) | Total lb./hr. (kg/hr) |
|---|---|---|---|---|
| 41 | 520 to 350 (271–177) | 120 | 350 (177) | 8.25 (3.74) |
| 42 | 520 to 360 (271–182) | 120 | 360 (182) | 7.88 (3.57) |
| 43 | 520 to 350 (271–177) | 120 | 350 (177) | 8.10 (3.67) |
| 44 | 520 to 350 (271–177) | 150 | 350 (177) | 8.62 (3.91) |
| 45 | 520 to 360 (271–182) | 120 | 360 (182) | 7.86 (3.57) |
| 46 | 520 to 460 (271–238) | 120 | 460 (238) | 7.85 (3.56) |

TABLE 16

| Example | Desiccant, Wt. % | Wt. % PP or HDPE | Wt. % AC 1702 Wax | Dispersant, Wt. % | Thickness mils (mm) |
|---|---|---|---|---|---|
| 41 | Calcium Oxide, 28.1% | PP, 28.7% | 41.8 | Hypermer LP1, 1.4% | 13.2 (0.34) |
| 42 | Potassium Carbonate, 25.5% | PP, 25.8% | 47.4 | Hypermer LP1, 1.3% | 10 (0.25) |
| 43 | Magnesium Sulfate, 27.9% | PP, 25.9% | 44.7 | Hypermer B246, 1.5% | 14 (0.35) |
| 44 | Syloid AL-1, 25.5% | PP, 24.4% | 48.5 | Hypermer LP1, 1.7% | 11.6 (0.29) |
| 45 | Hi-Sil SBG, 19.3% | PP, 26.7% | 45.6 | Hypermer LP1, 5.2% | 11.0 (0.28) |
| 46 | Hi-Sil SBG, 21.7% | HDPE, 19.1% | 53.3 | Hypermer LP1, 5.9% | 11–12 (0.28–0.30) |

Adsorption results for these films are given in Table 17. The results show that these desiccants in polyolefin/wax films adsorb a significant percent of the amount of water adsorbed by the same amount of virgin desiccant at 50% RH/20° C. In comparing rate results, it is helpful to also look at the total amount of water adsorbed by the film in terms of mg of water per gram of film. Thus, for Example 43, the time required to reach a given percent of the total amount adsorbed was long compared to the other examples but the amount of water adsorbed in the time required to reach 10% adsorption was large (10% of 242 mg water/g film=24 mg water). It is also useful to compare the initial rate of adsorption. Note in particular that there was a long induction period for calcium oxide during which little adsorption of water vapor took place. Two initial rates are give for calcium oxide: one for the very beginning of the adsorption curve (0.073 mg/g film-hr.) and for the following portion of the curve where the rate becomes mush more rapid (0.75 mg/g film-hr.). This induction period is useful for providing an extended period of time during manufacturing and converting during which the film can be exposed to ambient conditions without significant loss of adsorptive capacity.

TABLE 17

| Example | % of Theo. Wt. Gain | mg water/ gram film | Initial Rate mg water/g film-hr. | Time to Reach Given % of Actual Wt. Gain in Hours | | |
|---|---|---|---|---|---|---|
| | | | | 10% | 50% | 90% |
| 41 | 96.0 | 105 | 0.073 (0 to 8 hr.) 0.75 (30 to 50 hr.) | 32.7 | 87.4 | 162.5 |
| 42 | 65.0 | 175 | 2.00 | 4.8 | 37.1 | 96.8 |
| 43 | 100 | 242 | 1.03 | 24.5 | 235.4 | 705.5 |
| 44 | 49.5 | 30.5 | 2.30 | 1.4 | 29.9 | 100.1 |
| 45 | 70 | 9.42 | 3.50 | 0.3 | 2.2 | 6.4 |
| 46 | 66 | 10.5 | 3.00 | 0.3 | 2.9 | 15.9 |

EXAMPLES 47–50

Sorptive films were prepared by the Batch Method from compositions as described in Table 18. The desiccants were silica gel (grade Syloid AL-1 from Grace Davison; it was dried at 250° C. for 18 hr. before mixing; the dried powder adsorbed 25.00 wt. % water at 50% RH/20° C.); clay (obtained from sachets of Desiccite 25, obtained from Englehard Corp. (Jackson, Miss.); the material from inside the sachet was ground using an electric coffee grinder and dried at 150° C. for 24 hr.; the resultant powder adsorbed 20.1% by weight water at 50% RH/20° C.); and cellulose gum (sodium carboxy methyl cellulose from Fisher Scientific Co. (Cat. No. S-170); it was dried at 70° C. in a vacuum oven for 24 hr.; the dried powder adsorbed 23.1% by weight water when exposed at 50% RH/20° C.). The polypropylene used was grade DS 5D45 from Shell.

For Examples 47, 48, and 50, mixing conditions were 270° C. for 30 min. at 100 rpm, and then 230° C. for 5 min. at 100 RPM. For Example 49, mixing conditions were 200° C. for 30 min. at 100 RPM. Press conditions for these examples were 180° C. for 5 min. A lower mixing temperature was used for Example 49 to avoid degradation of the cellulose gum.

TABLE 18

| Example | Desiccant, Wt. % | PP Wt. % | Wax Wt. % | Irganox 1010, Wt. % | Thickness mils (mm) |
|---|---|---|---|---|---|
| 47 | Clay, 25.00% | 25.00 | AC 1702, 49.99% | 0.01 | 9–10 (0.23–0.25) |
| 48 | Clay, 25.00% | 25.00 | M-5150, 50.00% | None | 10–11 (0.25–0.28) |
| 49 | Cellulose Gum, 24.98% | 24.98 | AC 1702, 49.96% | 0.08 | 10–11 (0.25–0.28) |
| 50 | Silica Gel, 25.00% | 25.00 | M-5150, 50.00% | None | 9–10 (0.23–0.25) |

TABLE 19

| | | | | Time to Reach Given % of Actual Wt. Gain in Hours | | |
|---|---|---|---|---|---|---|
| Example | % of Theo. Wt. Gain | mg water/ gram film | Initial Rate mg water/ g film-hr. | 10% | 50% | 90% |
| 47 | 60.2 | 29.6 | 1.34 | 2.0 | 23.0 | 87 |
| 48 | 79.8 | 40.1 | 0.69 | 6.0 | 68.0 | 273 |
| 49 | 86.9 | 51.0 | 2.84 | 1.1 | 28.0 | 124 |
| 50 | 78.0 | 68.2 | 3.65 | 1.2 | 24.0 | 96 |

For Examples 47 and 48, note that the film made using M-5150 wax had higher adsorptivity than the analogous film made using AC 1702 wax. The same was true for Example 50 compared to Example 44. For porous desiccants such as clay, silica gel, and type 13X molecular sieves, lower adsorptivity was observed typically for use of AC 1702 wax than for other waxes. This was not the case for type 3A, 4A, and 5A molecular sieves. The reason for this is believed to be that low molecular weight components (oils) of AC 1702 wax penetrate the pores of desiccants having larger pores. Thus, for the noted types of porous desiccants, use of waxes having low oil content, higher MW waxes, and branched waxes will result in higher sorptivity after incorporation into a polyolefin/wax film.

EXAMPLES 51–64

The following examples illustrate preparation of sorptive films of the invention which change color upon adsorption of water. This was done in two ways: 1) by using a commercially available color-indicating desiccant which had the color-indicating substance integrated into the desiccant; or 2) by adding cobaltous chloride ($CoCl_2$) to the composition along with a desiccant.

Compositions are given in Table 20 and results are reported in Tables 21 and 22. The PP used was grade DS 5D45 from Shell. The X-2044 wax used was a developmental grade from Petrolite Corporation Polymers Division having an average molecular weight of 805 (by vapor phase osmometry). Cobaltous chloride hexahydrate from Mallinckrodt Chemical Works (St. Louis, Mo.) was dried at 150° C. for 48 hr. For use in the Extrusion Method, the dried $CoCl_2$ was ground in a ball mill (5 L jar, 1000 g of $CoCl_2$, 2.5 L of balls ranging in size from 60 to 190 mm for 16 hr.). For use in the Batch Method, all desiccants were ground into a fine powder using an electric coffee grinder. Indicating Drierite ($CaSO_4$ plus $CoCl_2$), from W. A. Hammond Drierite Co. (Xenia, Ohio), was ground into a fine powder using an electric coffee grinder for 2 min. and dried at 180° C. for 24 hr. Indicating grades of molecular sieve, silica gel (grade GR 42), and activated alumina (grade F-200) from Adsorbents and Desiccants Corp. of America (Gardena, Calif.) were ground into a fine powder using an electric coffee grinder for 2 min. but used without additional drying. Syloid AL-1 silica gel in fine powder form from Grace Davison was dried at 250° C. for 24 hr.

For the Extrusion Method, extrusion conditions were: barrel temperature, 271–182° F.; screw rpm, 120; die temperature, 182° F.; micropyramid-surfaced casting wheel (described in Ex. 41–46) at 66° C.; and 5.58 kg/hr. total throughput rate for Example 55 and 4.63 kg/hr. for Example 61. Compositions made by the Extrusion Method also contained 1.3 wt. % Hypermer B246 dispersant. For the Batch Method, mixing conditions were 270° C. for 30 min. at 100 rpm and pressing conditions were 2 min. at 180° C. for Examples 53, 57, and 60 and 5 min. at 180° C. for the others.

Water vapor adsorption experiments were done at 50% RH/20° C. using an environmental chamber from Thermotron, except for Examples 57 and 60, which were evaluated under ambient conditions (66 to 73% RH/21 to 23° C.). Useful color changes were observed in most cases. The final color change corresponded typically to about 80% or higher of the observed maximum weight gain, except for Examples 57 and 59. It is desirable for the indicator to display the final color change after a high percent of the desiccant has been used up. For films containing added $CoCl_2$, the theoretical weight gain was calculated using the weight of desiccant in the film times its activity plus the weight of $CoCl_2$ in the film times its activity.

Example 51 illustrates use of just $CoCl_2$ by itself as both desiccant and color change agent.

Examples 52–55 illustrate the use of Type 4A molecular sieve (MS) as the desiccant in combination with added $CoCl_2$. The lower than usual % wt. gain for Example 53 was due to longer than usual exposure of the molecular sieves during film preparation. Note that a blue to pink color change was observed for Examples 52 and 53, whereas the color change for Example 54 was blue to gray. This was due to use of $CoCl_2$ at a significantly lower % of total film weight than for Examples 53 and 54, 1 wt. % vs. about 5 wt. %. Note that the color change is affected by the color of the polymer and the wax and by color, usually tan, that develops due to degradation during processing in the batch mixer. At lower loadings of $CoCl_2$, these other sources of color will affect the overall color to a greater extent. Example 55 is similar to Example 53 except that the former was prepared using the extruder, whereas the latter was prepared using the batch mixer. The difference in color change between Examples 53 and 55 was due to the use of a dispersant in Example 55 (1.3 wt. % Hypermer B246) whereas no dispersant was used in Example 53. The color change for Example 55 was from blue to lighter blue, whereas the color change for Example 53 was the more typical blue to pink change.

Example 56 illustrates the use of a color-indicating grade of molecular sieve which resulted in a change in color from turquoise to tan.

Examples 57–61 illustrate the use of silica gel (Syloid Al-1) in combination with added $CoCl_2$ at various loadings using two different waxes, AC 1702 and X2044, respectively. Examples 57–60 and 62 were made using the batch mixer and Example 61 (which also included 1.3 wt. % Hypermer LP1) using the extruder. Note the higher % of theoretical weight gain for the examples using X-2044 wax, Example 57 compared to AC 1702 wax, Example 61. The lack of color change for Example 60 as compared to Examples 56–59 and 61 showed that about ≧0.8 wt. %

$CoCl_2$ as a percent of total film weight is needed in this composition to obtain a perceptible color change.

The indicating grade of silica gel, GR 42, was used for Example 62, for which no perceptible color change from the initial gray occurred. This material as purchased consisted of very large, pale blue crystals, so it wasn't surprising that the amount of color indicator present wasn't sufficient to show a color change after grinding into fine particulate.

TABLE 20

| Example | PP Wt. % | Wax, Wt. % | Desiccant, Wt. % | Added $CoCl_2$, Wt. % | Irganox 1010, Wt. % | Method |
|---|---|---|---|---|---|---|
| 51 | 24.7 | AC 1702 50.00% | — | 25.0 | None | Batch |
| 52 | 24.7 | X-2044 45.6% | 4A MS 24.7% | 4.9% | None | Batch |
| 53 | 24.7 | AC 1702 45.6% | 4A MS 24.7% | 4.9% | None | Batch |
| 54 | 24.7 | AC 1702 49.5% | 4A MS 24.7% | 1.0% | Yes | Batch |
| 55 | 22.8 | AC 1702 49.5% | 4A MS 20.9% | 5.5% | None | Extrusion |
| 56 | 26.0 | X-2044 48.0% | Indicating MS 26.0% | None | None | Batch |
| 57 | 24.7 | X-2044 48.0% | Syloid AL-1 24.7% | 4.9% | None | Batch |
| 58 | 24.75 | X-2044 49.51 | Syloid AL-1 24.75 | 0.99% | None | Batch |
| 59 | 19.84 | X-2044 39.68 | Syloid AL-1 39.68 | 0.79 | None | Batch |
| 60 | 24.88 | X-2044 49.75 | Syloid AL-1 24.88 | 0.50 | None | Batch |
| 61 | 20.7 | AC 1702 50.8% | Syloid AL-1 21.8% | 5.4% | None | Extrusion |
| 62 | 26.0 | X-2044 48.0% | GR 42 Silica Gel 26.0% | None | None | Batch |
| 63 | 25.0 | AC 1702 50.0% | F-200 Activated Alumina 25.0% | None | None | Batch |
| 64 | 25.0 | AC 1702 50.0% | Indicating Drierite 25.0% | None | Yes | Batch |

TABLE 21

| Example | Thickness mils (mm) | % Wt. Gain for Virgin Desiccant | % of Theo. Wt. Gain | mg water/gram film | Initial Rate mg/g film/hr. |
|---|---|---|---|---|---|
| 51 | 8–9 (0.20–0.23) | 84.7 | 91.3 | 193.1 | 7.5 |
| 52 | 10–11 (0.25–0.28) | 20.2 | 82.6 | 71.3 | 3.2 |
| 53 | 9–11 (0.23–0.28) | 20.2 | 51.1 | 46.8 | 2.5 |
| 54 | 10–11 (0.25–0.28) | 20.2 | 84.9 | 55.3 | 4.3 |
| 55 | 11–12 (0.28–0.30) | 23.1 | 80.3 | 75.0 | 3.6 |
| 56 | 10–11 (0.25–0.28) | 18.2 | 89.9 | 38.9 | 3.3 |
| 57 | 9–10 (0.23–0.25) | 25.0 | 81.5 | 83.7 | 3.0 |
| 58 | 9–10 (0.23–0.25) | 25.0 | 81.5 | 52.8 | 6.5 |
| 59 | 9–11 (0.23–0.28) | 25.0 | 66.4 | 74.8 | 47.5 |
| 60 | 9–11 (0.23–0.28) | 25.0 | 67.9 | 44.5 | 6.5 |
| 61 | 12–13 (0.30–0.33) | 25.0 | 65.4 | 64.8 | 4.2 |
| 62 | 11–12 (0.28–0.30) | 41.1 | 48.9 | 32.4 | 7.2 |
| 63 | 10–11 (0.25–0.28) | 15.9 | 52.8 | 21.0 | 1.9 |
| 64 | 8.5–9.5 (0.22–0.24) | 9.5 | 68.6 | 16.2 | 1.2 |

TABLE 22

| | Hours to Reach Given % of Maximum Wt. Gain | | | | % of Max. Wt. Gain at Final |
|---|---|---|---|---|---|
| Example | 10% | 50% | 90% | Color Change | Color Change |
| 51 | 4.3 | 80 | 285 | blue-pink | 87.5 |
| 52 | 3.2 | 44 | 166 | blue-pink | 93.0 |
| 53 | 2.1 | 15 | 58 | blue-pink | 84.3 |
| 54 | 1.5 | 26 | 81 | blue-gray | 96.1 |
| 55 | 2.1 | 28 | 87 | blue-light blue | 93.0 |
| 56 | 1.2 | 19 | 64 | turquoise-tan | 96.8 |
| 57 | 5 | 42 | 145 | blue-pink | 50.7 |
| 58 | 1.7 | 26 | 117 | gray-tan | 87.7 |
| 59 | 0.3 | 4.5 | 44 | turquoise-peach | 54.6 |
| 60 | 1.2 | 24 | 96 | None (gray-gray) | NA |
| 61 | 1.7 | 26 | 117 | blue-pink | 76.8 |
| 62 | 0.7 | 6.5 | 48 | gray-gray | NA |
| 63 | 1.1 | 18 | 70 | blue-pink | 82.8 |
| 64 | 1.4 | 14 | 37 | blue-colorless | 73.7 |

EXAMPLES 65–67

Examples 65–67 illustrate the formation of porous films by stretching polyolefin/wax films that contain hydrophilic molecular sieves. The rate of water vapor adsorption is shown to be much faster after stretching than before.

Compositions are given in Table 23, processing conditions (the Extrusion Method with a smooth casting wheel) in Table 24, and results in Tables 25 and 26.

TABLE 23

| Example | Polyolefin Wt. % | Wax Wt. % | 4A MS Wt. % | Hypermer B246 Wt. % |
|---|---|---|---|---|
| 65 | PP 16.2% | AC 1702 47.0% | 35.0% | 1.8% |
| 66 | PP 13.1% | AC 1702 39.3% | 45.3% | 2.3% |
| 67 | PP 61.9% | AC 1702 21.5% | 15.8% | 0.8% |

The PP used was grade DS 5D45 from Shell and the HDPE was grade 2804 from Fina. CP-11 wax, a copolymer having a MW of 1100 by vapor phase osmometry, was obtained from Petrolite Polymers Division.

TABLE 24

| Example | Barrel Temp. °F. (°C.) | Die Temp. °F. (°C.) | Screw RPM | Casting Wheel Temp. °F. (°C.) | Total Throughput, lb./hr. (kg/hr) |
|---|---|---|---|---|---|
| 65 | 520–370 271–188 | 370 (188) | 90 | 150 (66) | 8.64 (3.92) |
| 66 | 520–370 271–188 | 370 (188) | 90 | 150 (66) | 10.7 (4.85) |
| 67 | 530–420 277–216 | 400 (204) | 90 | 215 (102) | 6.46 (2.93) |

The films were stretched using a film stretcher from the T. M. Long Co. (Somerville, N.J.) using a stretch ratio of 2×2, and a set point of 110° C. The films were heated for 30 sec. before stretching and for 2 min. after stretching to heat set the films. Development of porosity was shown by the fact that the films became white, and development of through porosity was shown by the bubble point and Gurley results given below. The bubble point is a measure of the largest pore size in the film (ASTM F-316) and the Gurley is a measure of resistance to air flow. This value is a measurement of time in seconds to pass 50 cc of air through a film according to ASTM D-726 Method A. Bubble points were determined using Fluoroinert FC-43 (bubble point=6.64/breakthrough pressure in psi or bubble point=$4.58 \times 10^4$/pressure in pascals) available from 3M.

TABLE 25

| Example | Bubble Point microns | Gurley sec/50 cc |
|---|---|---|
| 65 | 0.60 | 91.5 |
| 66 | 6.6 | 11.3 |
| 67 | 0.09 | 2840 |

Results given in the table below for the rate of water vapor adsorption show that the rate of adsorption is much greater after stretching. Note that for films having the same composition, a thinner film will use up a given percent of its adsorptive capacity in a shorter time than a thicker film, but the effect of development of porosity in a film on the rate of adsorption is much greater than a change in film thickness. In general, higher percentages of sorbent particulate and higher percentages of wax result in larger bubble points, lower Gurleys, and faster rates of adsorption.

TABLE 26

| Example | Stretch Ratio | Thickness mils (mm) | Minutes to Reach Given % Adsorption | | |
|---|---|---|---|---|---|
| | | | 10% | 50% | 90% |
| 65 | 2 × 2 | 6.2 (0.16) | 0.7 | 3.2 | 44 |
| | 1.75 × 1 | 8 (0.20) | 2.8 | 192 | 1500 |
| | 0 | 10.5 (0.27) | 78 | 1008 | 2796 |
| 66 | 2 × 2 | 7.2 (0.18) | 0.7 | 3.2 | 23 |
| | 1.75 × 1 | 9 (0.23) | 1.62 | 24.6 | 900 |
| | 0 | 10.5 (0.27) | 84 | 1134 | 3216 |
| 67 | 2 × 2 | 7.5 (0.19) | 0.7 | 3.2 | 19 |
| | 1.75 × 1 | 9 (0.23) | 1.5 | 10.6 | 153 |
| | 0 | 12 (0.30) | 222 | 3960 | 11580 |

EXAMPLES 68–70

The following examples illustrate sorption of water vapor by films that did not become through-porous when stretched, though they did become micro-voided since they were whiter than the unstretched film. Though not through-porous, the rate of adsorption was much higher for stretched films. Some of this increase in rate was due merely to the decrease in film thickness due to stretching, but the magnitude of the increase was much larger than what would be expected due to the decrease in film thickness.

EXAMPLE 68

A film having the following composition was prepared using the Extrusion Method with a smooth casting wheel: 25.0 wt. % HDPE (grade 2804 from Fina), 56.0% CP 11 wax (a copolymer from Petrolite Polymers having a MW of 1100 by vapor phase osmometry), 18.1 wt. % Type 4A molecular sieve (obtained from Oxygen Services Company, St. Paul), and 0.9 wt. % Hypermer B246 dispersant (from ICI Americas). The film thickness was about 10.5 mil (0.27 mm). Extrusion conditions were: barrel temperature range, 282–266° C.; die, 254° C., screw rpm, 135, and casting wheel temperature set point, 88° C.

Pieces of this film were stretched by 1.75×1, Example 69, and 2×2, Example 70, using a film stretcher from the T. M. Long Company at a set point of 110° C. (30 sec. pre-heat, 2 min. heat set). The stretched films were non-through-porous as indicated by lack of a measurable Gurley or bubble point. Sorption of water vapor was determined at 50% RH/20° C. The molecular sieves used for these films had an adsorptivity of 22.3% by weight.

| Example | Stretch Ratio | Thickness mils (mm) | % of Theo. Wt. Gain | mg water/gram film | Initial Rate mg/g film-hr. | Hours to Reach Given % Adsorption | | |
|---|---|---|---|---|---|---|---|---|
| | | | | | | 10% | 50% | 90% |
| 68 | 0 | 5–7 0.13–0.18 | 84.7 | 34.2 | 1.6 | 5.5 | 208 | 756 |
| 69 | 1.75 × 1 | 7–9 0.18–0.23 | 82.5 | 33.3 | 10.9 | 0.3 | 36.9 | 143 |
| 70 | 2 × 2 | 10.5 0.27 | 93.1 | 37.6 | 40.0 | 0.1 | 8.9 | 100 |

EXAMPLES 71–72

These examples demonstrate sorption of ammonia vapors by films containing a hydrophobic type of molecular sieve, Abscents 3000™, sold by UOP (Molecular Sieve Department, Mt. Laurel, N.J.). This molecular sieve wasn't completely hydrophobic, as indicated by the sorption of about 2.4% water vapor by weight, as determined at 50% RH/20° C. For hydrophilic molecular sieves, such as Type 4A, up to 28% by weight water can be sorbed, though sorption by commercially available material is typically about 20 to 24% by weight.

EXAMPLE 71

A film was prepared which contained 34.6 wt. % Abscents 3000™, 17.1 wt. % polypropylene (grade DS 5D45, from Shell), 46.6 wt. % AC 1702 wax (from Allied Signal), and 1.7 wt. % Hypermer B246 dispersant (from ICI Americas). This film was prepared using the Extrusion Method and the same micropyramid-surfaced casting wheel used in Examples 41–46 at a set point temperature of 32° C. Extruder temperature ranges were: barrel, 271–171° C.; die, 171° C., screw rpm, 120; and total throughput rate of 8.2 lb./hr. (3.72 kg/hr). Film thickness was about 11.0 mil (0.28 mm).

EXAMPLE 72

A piece of film from Example 71 was stretched 2.5×2.5 using a film stretcher from the T. M. Long Company and using a set point of 49° C. (30 sec. pre-heat and 2 min. heat set). The stretched film was white, about 5.0 mil (0.13 mm) thick, and had a bubble point of 1.1 microns (as determined using FC43) and a Gurley of 620 sec/50 cc.

Stretched and unstretched films were evaluated for sorption of ammonia by placing them in a covered desiccator containing a pool of concentrated ammonium hydroxide in the bottom and determining the weight of the film as a function of time. A shallow layer of virgin Abscents 3000™ powder was exposed similarly. Results for the films are given in the table below. The virgin powder sorbed 17.% by weight and times required to sorb 10%, 50% and 90% of this weight gain were 0.2, 3.5, and 70 hr.

| Example | Stretch Ratio | mg sorbed/ g film | Initial Rate mg/g film- hr. | % of Theo. Wt. Gain | Time to Reach Given % of Maximum Wt. Gain | | |
|---|---|---|---|---|---|---|---|
| | | | | | 10% | 50% | 90% |
| 71 | None | 47.7 | 11.5 | 27.8 | 0.4 | 5.4 | 58 |
| 72 | 2.5 × 2.5 | 52.2 | 23.6 | 30.9 | 0.2 | 3.0 | 74 |

The results showed that either porous or non-porous films of this invention containing Abscents 3000™ were useful for sorbing ammonia vapors.

EXAMPLES 73–74

The following examples illustrate sorption by calcium oxide in an unstretched film and in a film of the same composition that became porous upon stretching.

EXAMPLE 73

The film composition was: 20.0 wt. % polypropylene (grade DS 5D45 from Shell), 38.1 wt. % AC 1702 wax (from Allied Signal), 39.4 wt. % (15.0 vol. %) calcium oxide (catalog number 33299, from Alfa), and 2.5 wt. % Hypermer LP1 dispersant (from ICI Americas). It was prepared by the Extrusion Method using a smooth casting wheel at a set point of 77° C. Extrusion temperature ranges were: barrel, 271–171° C.; screw rpm, 120; die, 171° C., and total throughput of 4.63 kg/hr. Film thickness ranged from about 11–12 mils (0.28–0.30 mm).

EXAMPLE 74

A piece of the film from Example 73 was stretched 2×2 using a film stretcher from the T. M. Long Company at a set point temperature of 71° C. (30 sec. pre-heat, 2 min. heat set). The resultant film was off-white in color, had a bubble point of 0.05 microns (as determined using FC-43), and a Gurley of about 8000 sec./50 cc.

Examples 73 and 74 were evaluated at 50% RH/20° C. The calcium oxide used showed an increase of 39 wt. % under these same conditions. As for Example 41, there was very little sorption during the first 8 hr. of exposure, followed by a period of more rapid adsorption. The results showed that the rate of adsorption was faster for the film that had been stretched.

| Example | Stretch Ratio | Thickness mils (mm) | % of Theo. Wt. Gain | mg water/ gram film | Hours to Reach Given % Adsorption | | |
|---|---|---|---|---|---|---|---|
| | | | | | 10% | 50% | 90% |
| 73 | 0 | 11–12 0.28–0.30 | 86.1 | 132.0 | 30 | 87 | 161 |
| 74 | 2 × 2 | 5.5–6.5 0.14–0.17 | 87.9 | 135 | 13.8 | 40 | 90 |

EXAMPLE 75

This example demonstrates the preparation of a film containing calcium oxide at about the same volume % of particulate to wax as for Example 33, which contained about 112 vol. % Type 4A molecular sieve relative to the volume of wax used. The densities used for these calculations were 1.1 g/cc for type 4A molecular sieve (dry), 3.3 g/cc for CaO (dry), and 0.88 g/cc for AC 1702 wax.

The following composition was prepared using the Batch Method: 4.60 wt. % HDPE (grade 2804 from Fina), 18.30 wt. % AC 1702 wax (from Allied Signal), and 77.10 wt. % CaO (from Alfa, cat. no. 10923). Mixer conditions were 100 rpm at 270° C. for 15 min. Press conditions were 180° C. for 5 min. The film was quenched by immersion in room temperature water after removing from the press and wiped quickly to remove water from it. The resultant film thickness ranged from about 10 to 12 mils.

A piece of this film was evaluated at 50% RH/20° C. It was found to sorb 291 mg/g of film. The times in hours to reach 10%, 50%, and 90% of the maximum amount sorbed were 77, 142, and 631, respectively. The rate of sorption was very slow during the first 50 hr., which was followed by a period of more rapid adsorption.

EXAMPLES 76–77

These examples demonstrate preparation and evaluation of films, unstretched and stretched, containing activated carbon as the sorbent. The activated carbon was a coconut based-carbon from Calgon, grade PCB-GHP, a developmental grade that was pulverized to provide a particle size distribution for which 90% by volume of the particles were less than about 11 microns.

EXAMPLE 76

The following composition was prepared using the Batch Method: 18.4 wt. % polypropylene (grade DS 5D45 from Shell), 34.1 wt. % M-5150 wax (from Moore and Munger), and 47.5 wt. % activated carbon. Mixer conditions were 100 rpm at 270° C. for 30 min. Press conditions were 200° C. for 7 min. The film was quenched in room temperature water. The resultant film was about 12 mil (0.30 mm) thick.

EXAMPLE 77

A piece of film from Example 76 was stretched 1.25×1 at a set point of 132° C. (30 sec. pre-heat, no heat set) using a film stretched from T. M. Long. This film was found to have a bubble point of about 0.1 micron (using FC43) and a very large Gurley (in excess of about 65,000 sec/50 cc). Examination by scanning electron microscopy showed that the bulk of the film was porous but that there was a skin on both surfaces. This skin was evidently thin enough to be ruptured in the bubble point experiment.

Pieces of unstretched and stretched films were exposed to TCE (trichloroethylene) vapors by placing inside a desiccator containing a pool of TCE in the bottom at room temperature. A sample of the virgin carbon was exposed similarly. The sample weight was followed as a function of time until the maximum amount of TCE had been sorbed: for unstretched film (Example 76), 227 mg/g of film (108 mg/g of carbon in film) was sorbed after 20 hr.; for stretched film (Example 77), 325 mg/g of film (154 mg/g of carbon in film) was sorbed after 23.5 hr., and for virgin activated carbon, 600 mg TCE was sorbed per gram of carbon after 48 hr. Thus, while the carbon in the films had lower sorptivity than the virgin carbon, these results demonstrated that carbon in a non-porous film as well as in a porous film having surface skins (not through-porous) still displayed sorptive activity.

What is claimed is:

1. A method for removing material from the air or from an object in the environment comprising preparing a sorptive article that comprises a polyolefin matrix, sorptive particles distributed in the polyolefin matrix, and a wax distributed within the polyolefin matrix, the wax and polyolefin having been melt-blended and the wax having phase-separated from the polyolefin on cooling of the mixture, whereby the article is sorptive but sorption is retarded in comparison to an article in which there is a void in the article in the places occupied by the wax; protecting the article from premature sorption by laminating it to a removable film or incorporating it in packaging; and removing the film or opening the packaging to provide the sorptive article proximate said air or object from which material is to be removed.

2. The method of claim 1 wherein the polyolefin of said polyolefin matrix is selected from polyethylene, polypropylene, or copolymers of ethylene and propylene, polybutylene, ethylene vinyl acetate, and blends thereof.

3. The method of claim 1 wherein the wax of the sorptive article is selected from paraffin waxes, microcrystalline waxes, Fisher-Tropsch waxes, low molecular weight polyethylene waxes and low molecular weight ethylene-propylene copolymers, and waxes found in nature.

4. The method of claim 1 in which the sorptive particles comprise water sorbent molecular sieves.

5. The method of claim 1 wherein said molecular sieves are synthetically produced crystalline metal alumino-silicates or naturally occurring sources containing crystalline metal alumino-silicates that have been activated for adsorption by removing their water of hydration.

6. The method of claim 1 in which the sorptive particles comprise hydrophobic molecular sieves.

7. The method of claim 1 in which the sorptive particles sorb vapors other than water vapor.

8. The method of claim 1 further comprising a dispersant to aid dispersion of the sorptive particles in the sorptive article.

9. The method of claim 1 further comprising a nucleating agent in the sorptive article promoting nucleation of the polyolefin.

10. The method of claim 1 wherein, when the polyolefin of the polyolefin matrix has a melt index of about 1 or less, the sorptive article comprises 20 to 80 parts by weight polyolefin, 80 to 20 parts by weight wax such that the sum of the parts by weight of polyolefin and wax is equal to 100, and between about 110 volume percent sorptive particles based on the weight of the wax and an amount to provide at least 10 weight percent sorptive particles based on the weight of total film.

11. The method of claim 1 wherein, when the polyolefin of the polyolefin matrix has a melt index of above about 1, the sorptive article comprises about 50 to 80 parts by weight polyolefin, 50 to 20 parts by weight wax such that the sum of the parts by weight of polyolefin and wax is equal to 100, and between about 110 volume percent sorptive particles based on weight of wax and an amount to provide at least 10 weight percent of sorptive particles based on weight of total film.

12. The method of claim 1 wherein, when the polyolefin of the polyolefin matrix has a melt index of substantially zero the sorptive article comprises about 2 to 50 parts by weight of the polyolefin, and 98 to 50 pats by weight wax, such that the sum of the parts by weight of polyolefin and wax is equal to 100, and between about 110 volume percent sorptive particles based on the volume of the wax and an amount to provide at least 10 weight percent sorptive particles based on the weight of the total film.

13. The method of claim 1 wherein the sorptive article has been stretched to make the article porous.

14. The method of claim 1 wherein the sorptive article includes an indicator that changes the color of the article upon sorption of material into the article.

15. An article comprising a sorptive article and packaging in which the sorptive article is incorporated to protect it from premature sorption, the sorptive article comprising a polyolefin matrix, sorptive particles distributed in the polyolefin matrix, and a wax distributed within the polyolefin matrix, the wax and polyolefin having been melt-blended and the wax having phase-separated from the polyolefin on cooling of the mixture, whereby the article is sorptive but sorption is retarded in comparison to an article in which there is a void in the article in the places occupied by the wax.

16. The sorptive article of claim 15 wherein the polyolefin of said polyolefin matrix is selected from polyethylenes, polypropylene, copolymers of ethylene and propylene, polybutylene, ethylene vinyl acetate, and blends thereof.

17. The sorptive article of claim 16 wherein said polyethylenes are selected from high-density polyethylene, low-density polyethylene, linear low-density polyethylene, and ultrahigh molecular weight polyethylene.

18. The sorptive article of claim 15 wherein said wax is selected from paraffin waxes, microcrystalline waxes, Fischer-Tropsch waxes, low molecular weight polyethylene waxes and low molecular weight ethylene-propylene copolymers, and waxes found in nature.

19. The sorptive article of claim 18 wherein the low molecular weight polyethylene waxes and the low molecular weight ethylene-propylene copolymers have a number average molecular weight of less than about 10,000.

20. The sorptive article of claim 15 in which the sorptive particles comprise water sorbent molecular sieves.

21. The sorptive article of claim 20 wherein the molecular sieves are synthetically produced crystalline metal alumino-silicates or naturally occurring sources containing crystalline metal alumino-silicates that have been activated for adsorption by removing their water of hydration.

22. The sorptive article of claim 15 in which the sorptive particles comprise hydrophobic molecular sieves.

23. The sorptive article of claim 15 in which the sorptive particles sorb vapors other than water vapor.

24. The sorptive article of claim 15 further comprising a dispersant for the sorptive particles.

25. The sorptive article of claim 15 wherein when the polyolefin of said polyolefin matrix is a polyethylene or polypropylene which has a melt index of about 1 or less, the sorptive article comprises 20 to 80 parts by weight polyolefin, 80 to 20 parts by weight wax such that the sum of the parts by weight of polyolefin and wax is equal to 100, and between about 110 volume percent sorptive particles based on the volume of the wax and an amount to provide at least 10 weight percent sorptive particles based on the weight of the total film.

26. The sorptive article of claim 15 wherein when the polyolefin of said polyolefin matrix has a melt index above about 1, the sorptive article comprises about 50 to 80 parts by weight polyolefin, about 50 to 20 parts by weight wax such that the sum of the parts by weight of polyolefin and wax is equal to 100, and between about 110 volume percent sorptive particles based on the volume of wax and an amount to provide at least 10 weight percent sorptive particles based on the weight of the total film.

27. The sorptive article of claim 15 wherein when the polyolefin of said polyolefin matrix is ultra high molecular weight polyethylene (UHMWPE), with a melt index of substantially zero, the sorptive article comprises about 2 to 50 parts by weight UHMWPE, and 98 to 50 parts by weight wax, such that the sum of the parts by weight of polyolefin and wax is equal to 100, and between about 110 volume percent sorptive particles based on the volume of wax and an amount to provide at least 10 weight percent sorptive particles based on the weight of the total film.

28. The sorptive article of claim 15 which has been stretched to make the article porous.

29. The sorptive article of claim 15 which includes an indicator that changes color of the article upon sorption of material into the article.

30. The sorptive article of claim 15 wherein the packaging of the article includes a film on at least one side that limits transmission of vapor into the article.

* * * * *